(12) United States Patent
Sawada

(10) Patent No.: US 10,033,889 B2
(45) Date of Patent: Jul. 24, 2018

(54) OPERATION UNIT AND IMAGE FORMING APPARATUS

(71) Applicant: CANON KABUSHIKI KAISHA, Tokyo (JP)

(72) Inventor: Hirohisa Sawada, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/697,998

(22) Filed: Sep. 7, 2017

(65) Prior Publication Data

US 2017/0374213 A1 Dec. 28, 2017

Related U.S. Application Data

(63) Continuation of application No. 15/206,970, filed on Jul. 11, 2016, now Pat. No. 9,794,438.

(30) Foreign Application Priority Data

Jul. 22, 2015 (JP) ................................ 2015-144580

(51) Int. Cl.
*G06F 15/00* (2006.01)
*H04N 1/00* (2006.01)
*H04N 1/44* (2006.01)

(52) U.S. Cl.
CPC ..... *H04N 1/00493* (2013.01); *H04N 1/00307* (2013.01); *H04N 1/00315* (2013.01);
(Continued)

(58) Field of Classification Search
CPC .......... H04N 1/00493; H04N 1/00411; H04N 1/00384; H04N 1/00307; H04N 2201/0094; H04N 2201/006
(Continued)

(56) References Cited

U.S. PATENT DOCUMENTS 6,115,034 A 9/2000 Tanaka et al.
9,794,438 B2 * 10/2017 Sawada .............. H04N 1/00493
(Continued)

FOREIGN PATENT DOCUMENTS

EP 2 657 776 A2 10/2013
EP 2 657 776 A3 6/2015
(Continued)

OTHER PUBLICATIONS

Search Report and Written Opinion of the Intellectual Property Office of Singapore dated Oct. 21, 2016, in Singapore Patent Application No. 10201605821R.
(Continued)

*Primary Examiner* — Saeid Ebrahimi Dehkord
(74) *Attorney, Agent, or Firm* — Fitzpatrick, Cella, Harper & Scinto

(57) ABSTRACT

An image forming apparatus includes a panel portion connected with a control portion of an apparatus body and being capable of executing at least one of functions of displaying information obtained from the control portion and of inputting information to the control portion, and an antenna capable of transmitting/receiving radio waves to/from a mobile terminal brought close to the antenna. The NFC substrate can make communication between the mobile terminal brought close to the antenna and the control portion by a near field communication system. The antenna is provided under and in a vicinity of the panel portion in a front view of the panel portion.

9 Claims, 11 Drawing Sheets

(52) U.S. Cl.
CPC ..... *H04N 1/00342* (2013.01); *H04N 1/00384* (2013.01); *H04N 1/00411* (2013.01); *H04N 1/00564* (2013.01); *H04N 1/4426* (2013.01); *H04N 2201/006* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | |
|---|---|---|
| 2009/0200370 A1 | 8/2009 | Watase et al. |
| 2012/0243042 A1* | 9/2012 | Uchida ................ G06F 1/1624 |
| | | 358/1.15 |
| 2012/0262749 A1 | 10/2012 | Yamamoto |
| 2013/0128298 A1 | 5/2013 | Yamada |
| 2013/0155450 A1 | 6/2013 | Higashikawa |
| 2013/0286433 A1 | 10/2013 | Matsushima et al. |
| 2014/0132652 A1 | 5/2014 | Nakamura |
| 2014/0146334 A1* | 5/2014 | Yuzawa ............. H04N 1/00127 |
| | | 358/1.13 |
| 2014/0240778 A1 | 8/2014 | Itogawa |
| 2014/0253949 A1 | 9/2014 | Tsujimoto |
| 2014/0293328 A1 | 10/2014 | Wakizaka et al. |
| 2015/0263411 A1 | 9/2015 | Asai |

FOREIGN PATENT DOCUMENTS

| | | |
|---|---|---|
| JP | 11-338317 A | 12/1999 |
| JP | 2010-049169 A | 3/2010 |
| JP | 2013-228540 A | 11/2013 |
| JP | 2014-021241 A | 2/2014 |

OTHER PUBLICATIONS

European Office Action dated Dec. 5, 2016 in European Patent Application No. 16178329.5.

* cited by examiner

OPERATION UNIT AND IMAGE FORMING APPARATUS

This application is a continuation of U.S. patent application Ser. No. 15/206,970, which was filed Jul. 11, 2016, the contents of which are incorporated herein by reference.

BACKGROUND OF THE INVENTION

Field of the Invention

The present invention relates to an operation unit and an image forming apparatus and more specifically to the operation unit and the image forming apparatus used by a near field communication system (NFC) or a contactless communication system such as a contactless IC card.

Description of the Related Art

Hitherto, in a field of an image forming apparatus such as a copier, a printer, a facsimile, and a multifunction printer having a plurality of those functions, various methods for inputting data to a body of the image forming apparatus body (referred to as an 'apparatus body' hereinafter) are being developed. One of such methods being developed is an image forming apparatus adopting a near field communication system (NFC) that permits to execute data communication between the apparatus body and a mobile terminal or a contactless IC card (authentication card) brought close to the apparatus body as disclosed in US Patent Application Publication No. 2014/0253949 A1 for example.

This image forming apparatus includes a panel portion, i.e., a liquid crystal display touch panel provided at an upper part of an apparatus body and an NFC substrate including an antenna portion provided on a left side of the panel portion. This image forming apparatus permits the user to execute various data communication with the apparatus body by the near field communication by bringing the mobile terminal or the authentication card close to the NFC substrate.

However, because the NFC substrate is disposed on the left side of the panel portion in the image forming apparatus disclosed in US Patent Application Publication No. 2014/0253949 A1, there is a case where the user unintentionally hides the panel portion by his/her hand in bringing the mobile terminal or the authentication card close to the NFC substrate, thus impairing visibility and operability of the panel portion. Still further, because the NFC substrate is disposed on the left side of the panel portion, there is a case where the user's hand, the mobile terminal, or the authentication card touches the panel portion, thus causing an erroneous operation of the apparatus body, when the user brings the mobile terminal or the authentication card close to the NFC substrate. That is, the operability is worsened. Although it is conceivable to assure an enough area on the left side of the panel portion so that the user's hand, the mobile terminal, or the authentication card does not touch the panel portion even when the user brings the mobile terminal or the authentication card close to the NFC substrate, this case will inevitably increases a size of the apparatus body.

SUMMARY OF THE INVENTION

Accordingly, the present invention provides an operation unit, and an image forming apparatus, in which a communication portion is optimally disposed within the operation unit while improving operability.

According to one aspect of the invention, the image forming apparatus includes an image forming portion configured to form an image on a recording medium, an operation unit including at least a panel portion displaying information, a communication portion provided in the operation unit, including an antenna capable of transmitting/receiving radio waves to/from a communication device brought close to the operation unit, and capable of making communication between the communication device and the antenna by a near field communication system. The antenna is provided at a position neighboring the panel portion on a front side of the panel portion in a direction heading from a back surface to a front surface of the image forming apparatus and within an area of the panel portion in a direction orthogonal to the direction heading from the back surface to the front surface of the image forming apparatus.

Further features of the present invention will become apparent from the following description of exemplary embodiments with reference to the attached drawings.

DESCRIPTION OF THE EMBODIMENTS

First Embodiment

An image forming apparatus 1 of a first embodiment of the present invention will be described below in detail with reference to FIGS. 1 through 5. It is noted that in the present embodiment, a direction from a front side, to which a user faces, of the image forming apparatus to a back side will be denoted as a back direction B, a direction from the back side to the front side as a front direction F, a direction from a right side to a left side of the image forming apparatus when viewing from the from side as a left direction L, a direction from the right side to the left side of the image forming apparatus as a right direction R, a direction from a lower side to an upper side of the image forming apparatus as an upper direction U, and a direction from the upper side to the lower side of the image forming apparatus as a downward direction D, respectively, as indicated in the respective drawings. The image forming apparatus 1 is configured such that a user stands on the direction F side of the image forming apparatus and executes various operations by facing the back direction B side.

Figure 1:
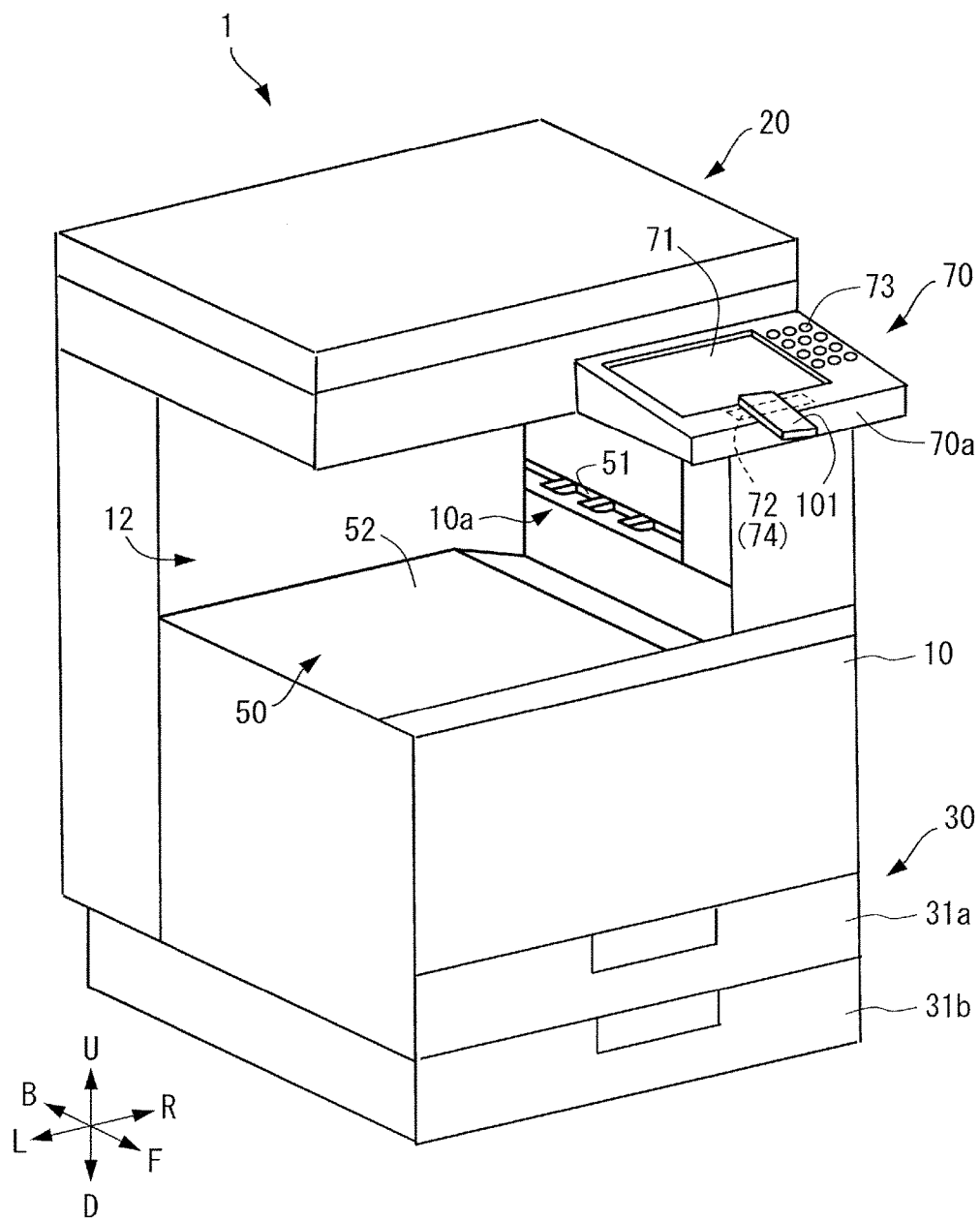
FIG. 1 is a perspective view schematically illustrating a configuration of an image forming apparatus of a first embodiment.

As illustrated in FIG. 1, the image forming apparatus 1 of the present embodiment is an electro-photographic multi-function printer having functions of a copier, a printer, and a facsimile. However, the image forming apparatus of the present invention is not limited to be the electro-photographic multifunction printer, and may be an ink-jet type image forming apparatus or an image forming apparatus having a single function such as a copier and a printer.

As illustrated in FIG. 1, the image forming apparatus 1 includes a body of the image forming apparatus (referred to as an 'apparatus body' hereinafter) 10. The apparatus body 10 includes an image reading portion 20, a sheet feeding portion 30, an image forming portion 40, a sheet discharge portion 50, a control portion 60 (see FIG. 2), and an operating portion 70. It is noted that the sheet, i.e., a recording medium, is what a toner image is formed thereon. Specifically, the sheet includes a plain sheet, a synthetic resin sheet as a substitute of the plain sheet, a thick sheet, an overhead projector sheet, or the like.

The image reading portion 20 is a flatbed scanner unit for example and is provided at an upper part of the apparatus body 10. The image reading portion 20 includes a platen glass not illustrated as a document placement table, a light source, not illustrated, illuminating the document placed on the platen glass with light, an image sensor, not illustrated, converting a reflection light into digital signals, and others.

Figure 2:
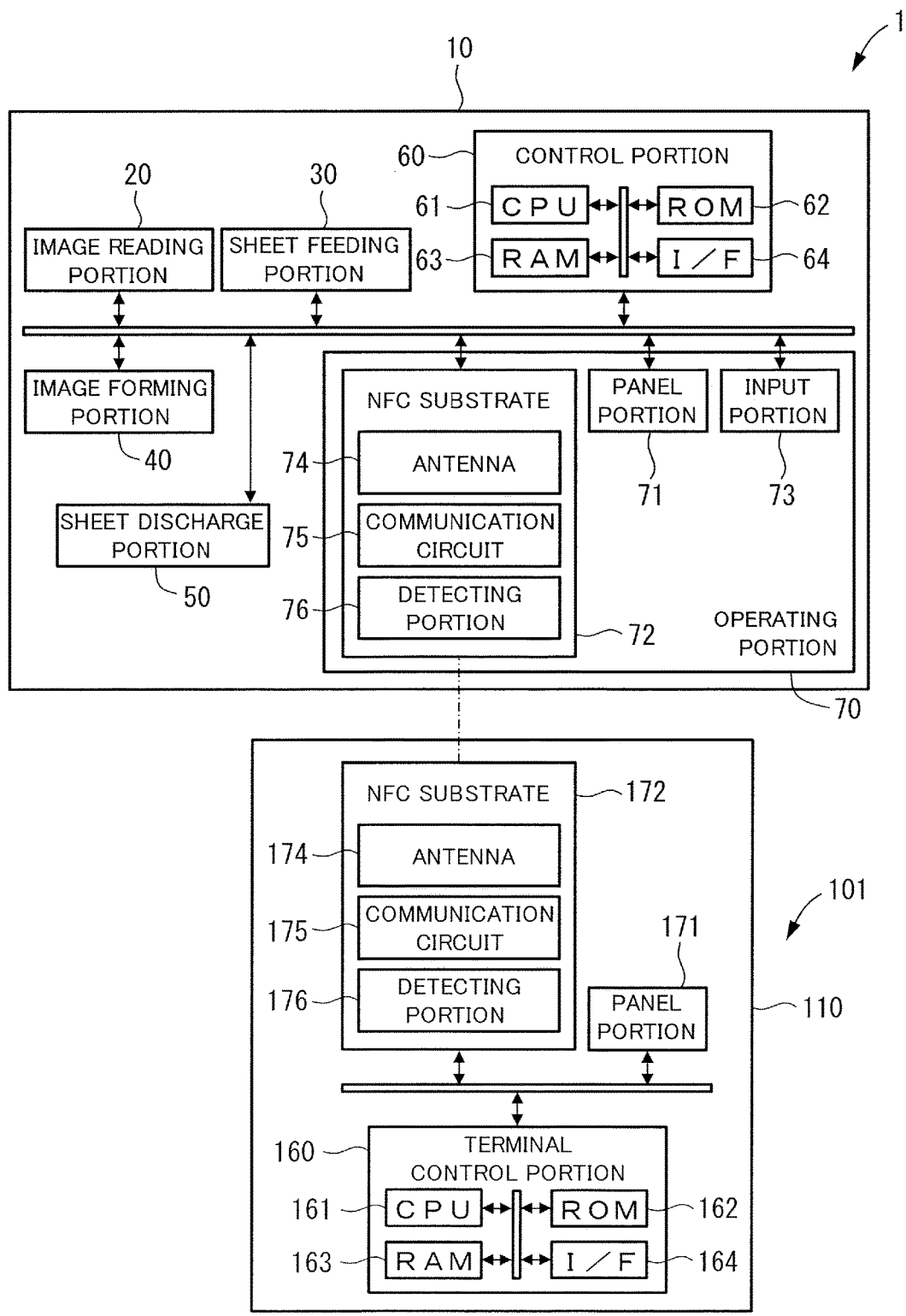
FIG. 2 is a block diagram schematically illustrating a control system of an image forming apparatus of the first embodiment.

The sheet feeding portion 30 is disposed at a lower part of the apparatus body 10 and includes a sheet cassettes 31a and 31b stacking and storing the sheet to be fed to the image forming portion 40 (see FIG. 2).

The image forming portion 40 includes an image forming unit, toner bottles, an intermediate transfer unit, a secondary transfer portion, a fixing unit and others, all of which are not illustrated, to form an image on the sheet based on image information transmitted from the control portion 60.

The sheet discharge portion 50 includes a discharge roller 51 discharging the sheet on which the image has been formed and a discharge tray 52 disposed downstream of the discharge roller 51. The discharge rollers 51 discharge the sheet on which the image has been formed through a discharge port 10a of the apparatus body 10. The discharge tray 52 is a face-down tray and stacks the sheet discharged out of the discharge port 10a. Still further, a space between the image reading portion 20 and the discharge tray 52 composes an in-body space 12.

As illustrated in FIG. 2, the control portion 60 is composed of a computer and includes, for example, a CPU 61, a ROM 62 storing programs controlling the respective components, a RAM 63 temporarily storing data, and an input/output (I/F) circuit 64 inputting/outputting signals from/to an outside. The control portion 60 is connected with the image reading portion 20, the sheet feeding portion 30, the image forming portion 40, the sheet discharge portion 50, and the operating portion 70 through the input/output circuit 64 and exchanges signals to control the respective portions.

Next, the operating portion (operating unit) 70, i.e., a characteristic part, of the image forming apparatus 1 of the present embodiment will be described in detail. In the present embodiment, the operating portion 70 is configured to be able to communicate with a user's mobile terminal (communication device, e.g., a smart phone) 101 by the near field communication system (referred to as a 'NFC system' hereinafter). It is noted that the communication device is not limited to be the mobile terminal and may be a contactless IC card.

Figure 3:
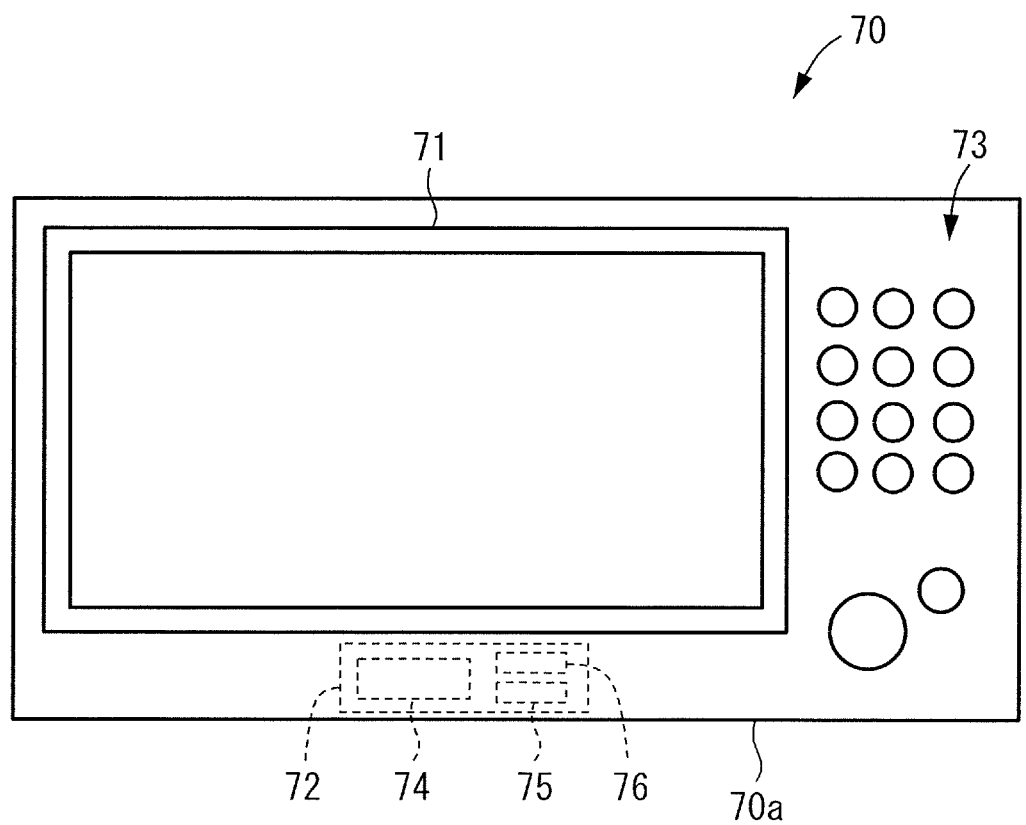
FIG. 3 is a front view schematically illustrating an operating portion of the first embodiment.
Figure 3:
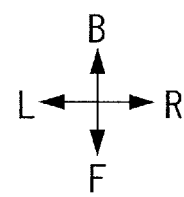

As illustrated in FIG. 1, the operating portion 70 is provided at an upper front part of the apparatus body 10. In the present embodiment, the operating portion 70 is provided on the front direction F side of the image reading portion 20 so that the user can readily operate. The operating portion 70 is integrated with the apparatus body 10 and is provided immovably with respect to the apparatus body 10. As illustrated in FIGS. 2 and 3, the operating portion 70 includes a panel portion 71, an NFC substrate (communication portion) 72, and an input portion 73.

The panel portion 71 is provided approximately horizontally and is constructed by way of overlapping a resistance film type or an electrostatic capacitance type touch panel on a liquid crystal display type display panel in a thickness direction. The panel portion 71 permits the user to execute various input operations by pressing operation keys displayed on the touch panel. The panel portion 71 is connected with the control portion 60 of the apparatus body 10 and is configured to be able to execute at least one of functions of displaying information obtained from the control portion 60 and of inputting information to the control portion 60. Specifically, the panel portion 71 displays information necessary for the user to operate the image forming apparatus 1 such as remaining amounts of sheets and toners replenished to the apparatus body 10, alarm messages when these expendables get less, procedures in replenishing the expendables, and others. The panel portion 71 also receives inputs operated by the user such as settings of size and basis weight of a sheet, image density control, a number of sheets to be outputted, and others.

The NFC substrate 72 communicable with the mobile terminal 101 by the NFC system includes an antenna 74 formed of a loop antenna, a communication circuit 75, and a detecting portion 76. That is, the NFC substrate 72 is capable of communicating the mobile terminal 101 brought close to the antenna 74 with the control portion 60 by the NFC system. Still further, according to the present embodiment, the antenna 74, the communication circuit 75, and the detecting portion 76 are integrally formed on the NFC substrate 72. That is, the panel portion 71 and the antenna 74 are integrated with the apparatus body 10 and are fixedly provided immovably with respect to the apparatus body 10. However, the present invention is not limited to such configuration and the antenna may be disposed at a position separated from the NFC substrate and may be connected with the NFC substrate through a cable. This arrangement makes it possible to increase a degree of freedom of the position where the antenna is disposed.

The antenna 74 can transmit/receive radio waves to/from the mobile terminal 101 brought close to the antenna 74 by the NFC system and thus can communicate with the mobile terminal 101. The communication circuit 75 performs signal processing on the radio waves transmitted/received as described above. The detecting portion 76 detects intensity of the radio wave (received wave) received by the antenna 74 and of the radio wave (transmission wave) transmitted from the antenna 74.

Here, as illustrated in FIG. 3, the NFC substrate 72 with which the antenna 74 is integrated is disposed under and in a vicinity of the panel portion 71 in a front view of the panel portion 71. It is noted that the 'front view' here is a direction in which the panel portion 71 is normally used and in which the panel portion 71 is viewed from a direction vertical to the panel surface. That is, similarly to the directions indicated by the arrows in FIG. 1, 'B' in FIG. 3 denotes a direction of the back surface of the image forming apparatus 1, and 'F' denotes a direction of the front surface of the image forming apparatus 1.

According to the present embodiment, because the panel portion 71 is provided approximately horizontally with respect to the image forming apparatus 1, the antenna 74 is disposed at a position neighboring the panel portion 71 on the front direction F side of the panel portion 71 with respect to apparatus body 10. That is, in the image forming apparatus 1, the antenna 74 is located on the front (front surface) side of the panel portion 71 in a direction heading from the back surface (B) to the front surface (F) of the image forming apparatus 1. Then, the antenna 74 is disposed within an area of the panel portion 71 in a left-right (LR) direction, i.e., in a direction orthogonal to the direction heading from the back surface (B) to the front surface (F) of the image forming apparatus 1.

Still further, according to the present embodiment, the antenna 74 is provided in a front end portion 70a of the operating portion 70 of the apparatus body 10. In the present embodiment, the NFC substrate 72 is disposed in a vicinity of an upper part (surface side) of the operating portion 70. This arrangement makes it possible to make the user harder from unintentionally covering the panel portion 71 by his/her hand when the user brings the mobile terminal 101 close to the NFC substrate 72. Still further, because the NFC substrate 72 is disposed in the vicinity of the panel portion 71, the user can readily know the position of the NFC substrate 72.

The input portion 73 includes ten keys for inputting numerals, keys for starting (executing) or stopping an image forming operation, and others. The input portion 73 is provided on the right direction R side of the panel portion 71 in the present embodiment. That is, the input portion 73 is disposed at least one side in the left-right direction of the panel portion 71. This arrangement makes it possible for the use to input information to the control portion 60 without covering the panel portion 71 by his/her hand in operating the operating portion 70 while watching the panel portion 71.

Meanwhile, as illustrated in FIG. 2, the mobile terminal 101, e.g., a smart phone, includes a terminal control portion 160, a panel portion 171, an NFC substrate 172, and others.

Similarly to the control portion 60 of the image forming apparatus 1, the terminal control portion 160 is composed of a computer and includes, for example, a CPU 161, a ROM 162 storing programs, a RAM 163 temporarily storing data, and an input/output (I/F) circuit 164. Similarly to the NFC substrate 72 of the operating portion 70, the NFC substrate 172 communicable with the operating portion 70 of the apparatus body 10 by the NFC system includes an antenna 174 formed of a loop antenna and, a communication circuit 175, a detecting portion 176, and others. The NFC substrate 172 is attached to a back surface side of the mobile terminal 101 (a surface on an opposite side of a front surface where the panel portion 171 is provided). The panel portion 171 is constructed by way of overlapping a resistance film type or an electrostatic capacitance type touch panel on a liquid crystal display type display panel in a thickness direction, so that the user can perform various input operations by pressing operation keys displayed on the touch panel. That is, the operating portion 70 can operate the image forming portion 40 and others through the control portion 60. In order to execute the communication between the operating portion 70 and the mobile terminal 101 by the NFC system, it is necessary to bring the mobile terminal 101 close to the antenna 74 such that a distance between the two communication antennas 74 and 174 falls within a communication range.

Next, an operation of the image forming apparatus 1 of the present embodiment for executing the communication with the mobile terminal 101 by the NFC system will be described.

Figure 4:
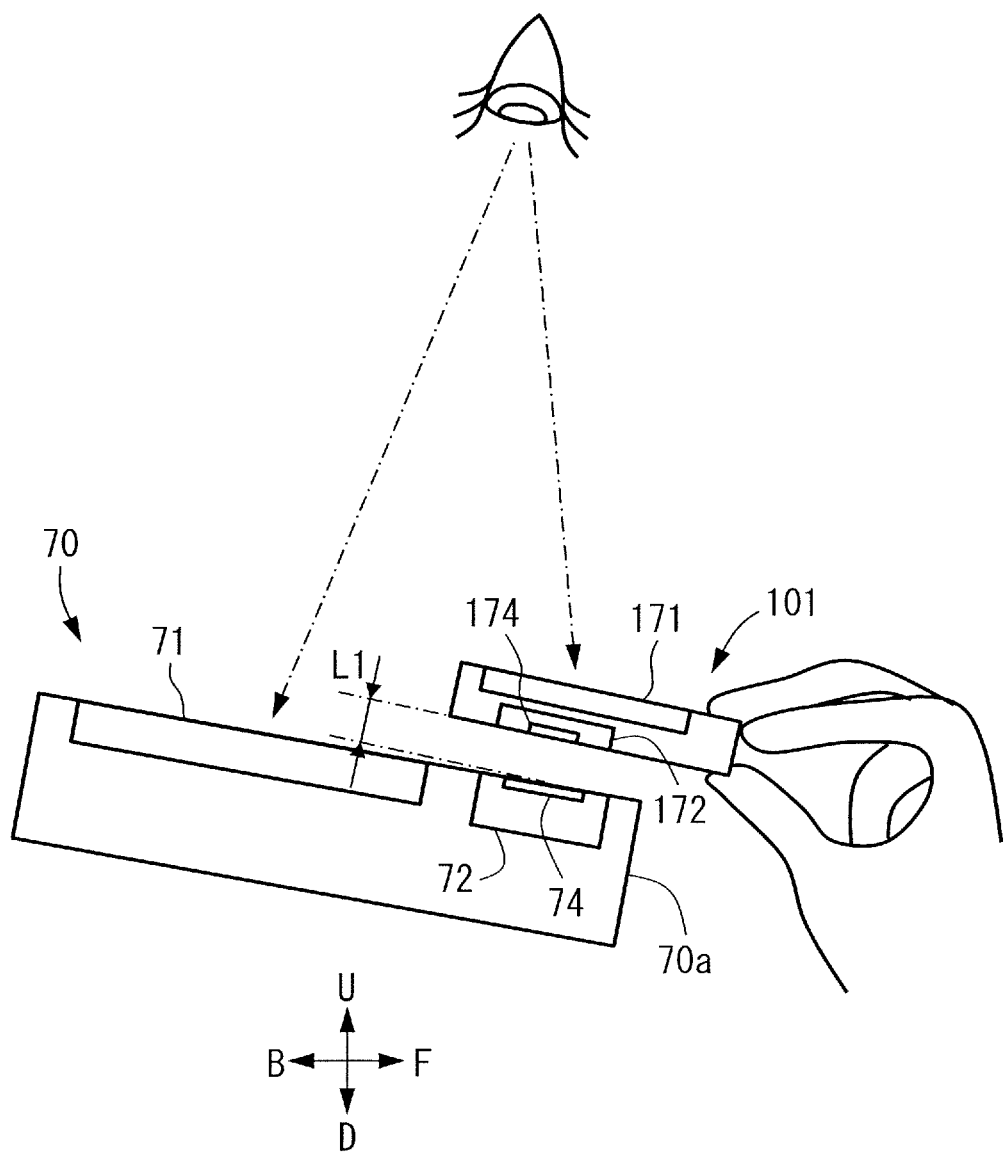
FIG. 4 is a section view schematically illustrating a state in which a mobile terminal is brought close to the operating portion in parallel with the operating portion of the first embodiment.

At first, a case when the user brings the mobile terminal 101 close to the operating portion 70 while approximately parallelizing the mobile terminal 101 with the operating portion 70 as illustrated in FIG. 4 will be described. At this time, a guidance urging the user to hold up the mobile terminal 101 to the NFC substrate 72 is displayed on the panel portion 71. The user can make the communication by bringing the mobile terminal 101 within an area of radio waves of the NFC substrate 72 such that a distance between the antenna 74 and the antenna 174 falls within a distance L1. The control portion 60 performs authentication and others when the antenna 74 is brought close to the antenna 174 within the distance L1, and the panel portions 71 and 171 display authentication results, respectively. At this time, because the user's hand holding the mobile terminal 101 does not overlap with the panel portion 71, it is possible to reduce a probability of covering the panel portion 71 or of erroneously pressing the operation key of the panel portion 71. Still further, because the NFC substrate 72 including the antenna 74 is disposed in the vicinity of the panel portion 71, the user can readily watch the guidance and can operate the image forming apparatus 1 with high operability. Still further, because the user can watch the respective panel portions 71 and 171 almost without moving his/her gaze (see dot chain lines in FIG. 4), the operability improves further.

Figure 5:
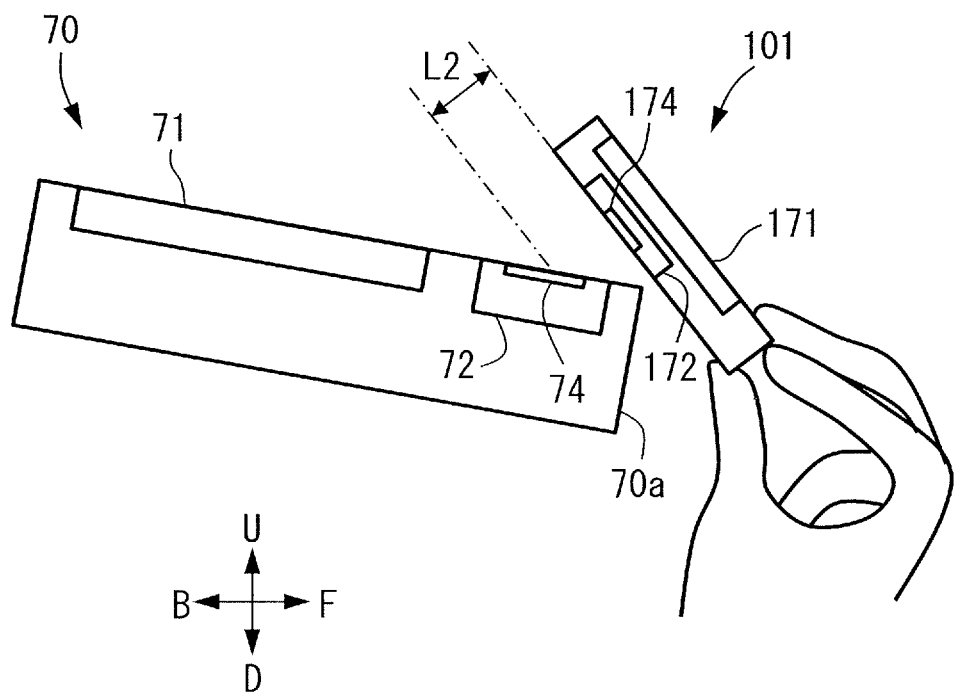
FIG. 5 is a section view schematically illustrating a state in which the mobile terminal is brought close to the operating portion of the first embodiment while tilting the mobile terminal.

Next, a case where the user brings the mobile terminal 101 close to the operating portion 70 while tilting the mobile terminal 101 with respect to the operating portion 70 as illustrated in FIG. 5 will be described. In this case, the user can execute the communication by bringing the mobile terminal 101 close to the antenna 74 such that a distance between the antennas 74 and 174 falls within a distance L2. Here, the user brings the mobile terminal 101 close to the front surface of the apparatus body 10, i.e., to the front end portion 70a of the operating portion 70, so as to separate a front edge of the mobile terminal 101 from the panel portion 71 so that the mobile terminal 101 does not touch the panel portion 71. This operation makes it possible to bring the NFC substrate 172 on the mobile terminal 101 side close to the NFC substrate 72, i.e., within the area of radio waves of the NFC substrate 72, and to make the communication between the antennas 74 and 174.

Because the position of the NFC substrate 72 is separated also from the right side of the panel portion 71 where the input portion 73 is disposed in either case, it is possible to prevent an erroneous operation of touching the input key of the input portion 73 during the NFC communication.

As described above, according to the image forming apparatus 1 of the present embodiment, the antenna 74 is disposed under and in the vicinity of the panel portion 71 in the front view of the panel portion 71. Due to that, it is possible to make the panel portion 71 being hardly covered by the user's hand or the mobile terminal 101 or the user's hand touching the panel portion 71 when the user brings the mobile terminal 101 close to the antenna 74. Still further, because no flat space for the mobile terminal 101 or the authentication card is required, it is possible to downsize the operating portion 70. This arrangement makes it possible to enhance the operability of the operating portion 70 without increasing the size of the apparatus body 10.

Here, if the NFC substrate 72 is disposed on the right direction R side of the panel portion 71, a possibility of covering the panel portion 71 by an arm or of touching the panel portion 71 by the hand increases if the user brings the mobile terminal 101 close to the NFC substrate 72 by a left hand. Still further, because the input portion 73 is disposed in the vicinity and on the right direction R side of the panel portion 71 in general, it is necessary to dispose the NFC substrate 72 further on the right direction R side of the input portion 73 in order to avoid the problem described above. Then, the panel portion 71 becomes distant from the NFC substrate 72, deteriorating the operability of the operation made while watching the panel portion 71.

Still further, if the NFC substrate 72 is disposed on the left direction L side, the possibility of covering the panel portion 71 by an arm or of touching the panel portion 71 by hand increases if the user brings the mobile terminal 101 close to the NFC substrate 72 by a right hand. Still further, if the NFC substrate 72 is disposed on the back direction B side of the panel portion 71, the possibility of covering the panel portion 71 by the arm or of touching the panel portion 71 by the hand increases when the user brings the mobile terminal 101 close to the NFC substrate 72 by the either hand of the right and left hands.

However, according to the image forming apparatus 1 of the present embodiment, the NFC substrate 72 is disposed on the front direction F side of the panel portion 71. Therefore, the panel portion 71 is hardly covered by the arm or touched by the hand. Still further, because the input portion 73 is disposed on the left or right side of the panel portion 71, the possibility of causing the erroneous operation is low.

Still further, according to the image forming apparatus 1 of the present embodiment, because the antenna 74 is disposed at the front end portion 70a of the operating portion 70, it is possible to execute the communication while holding the mobile terminal 101 or the authentication card up straight in front of the operating portion 70. This arrangement makes it possible to execute the communication with the operating portion 70 even in a case where the user brings the mobile terminal 101 close to the operating portion 70 while hanging the mobile terminal 101 from his/her neck. It is also possible to improve the operability further by reducing the possibility of touching the panel portion 71 or the input portion 73 and by assuring the visibility of the panel portion 71.

Second Embodiment

A second embodiment of the present invention will be described below in detail with reference to FIGS. 6 through 9. A configuration of the present embodiment is different from that of the first embodiment in that an operation unit 270 is provided separately from and movably with respect to the apparatus body 10. The configuration of the present embodiment, other than that described above, is the same with that of the first embodiment, so that the same or corresponding components with those of the first embodiment will be denoted by the same reference numerals and detailed description thereof will be omitted here.

Figure 6:
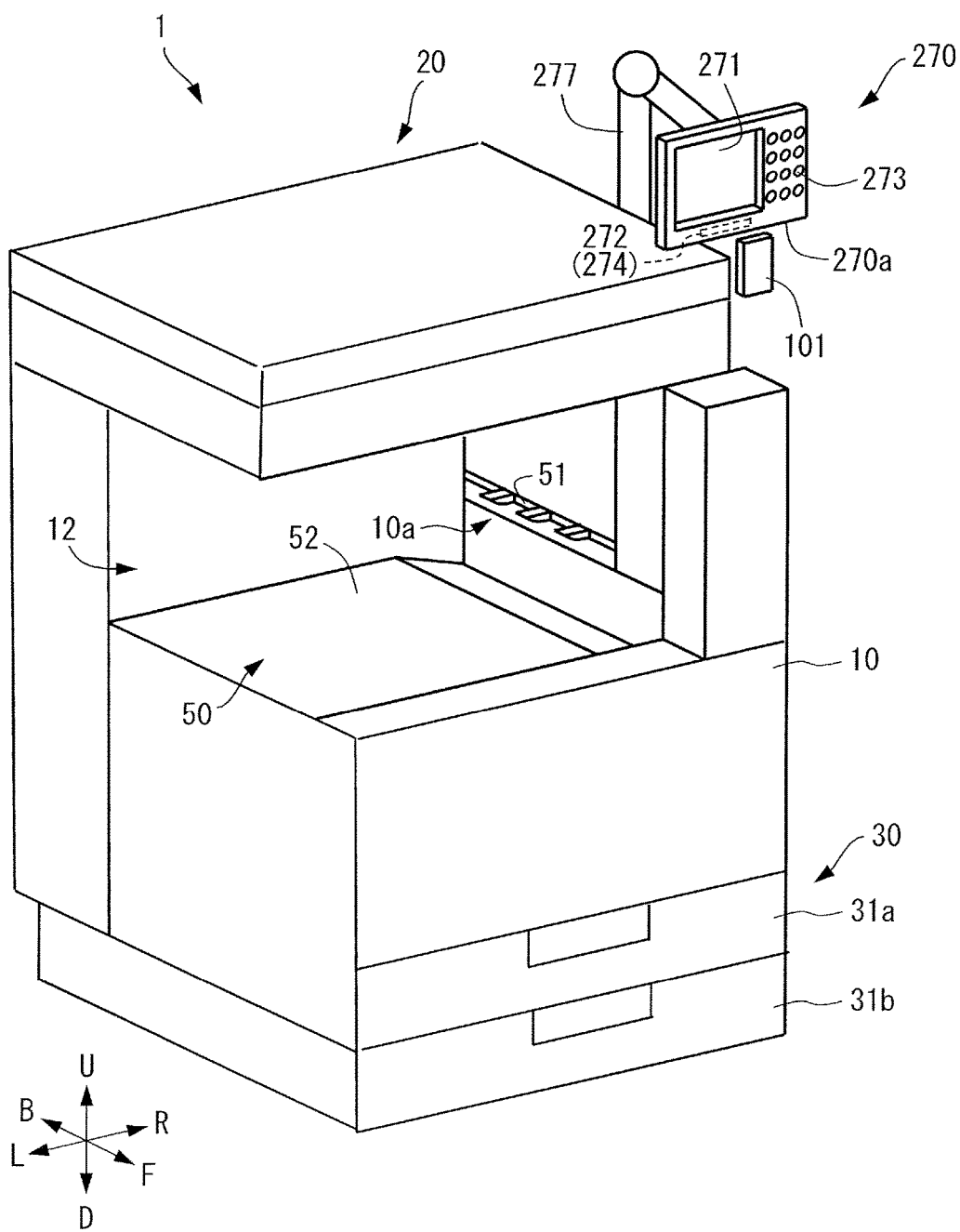
FIG. 6 is a perspective view schematically illustrating an image forming apparatus of a second embodiment.
Figure 7:
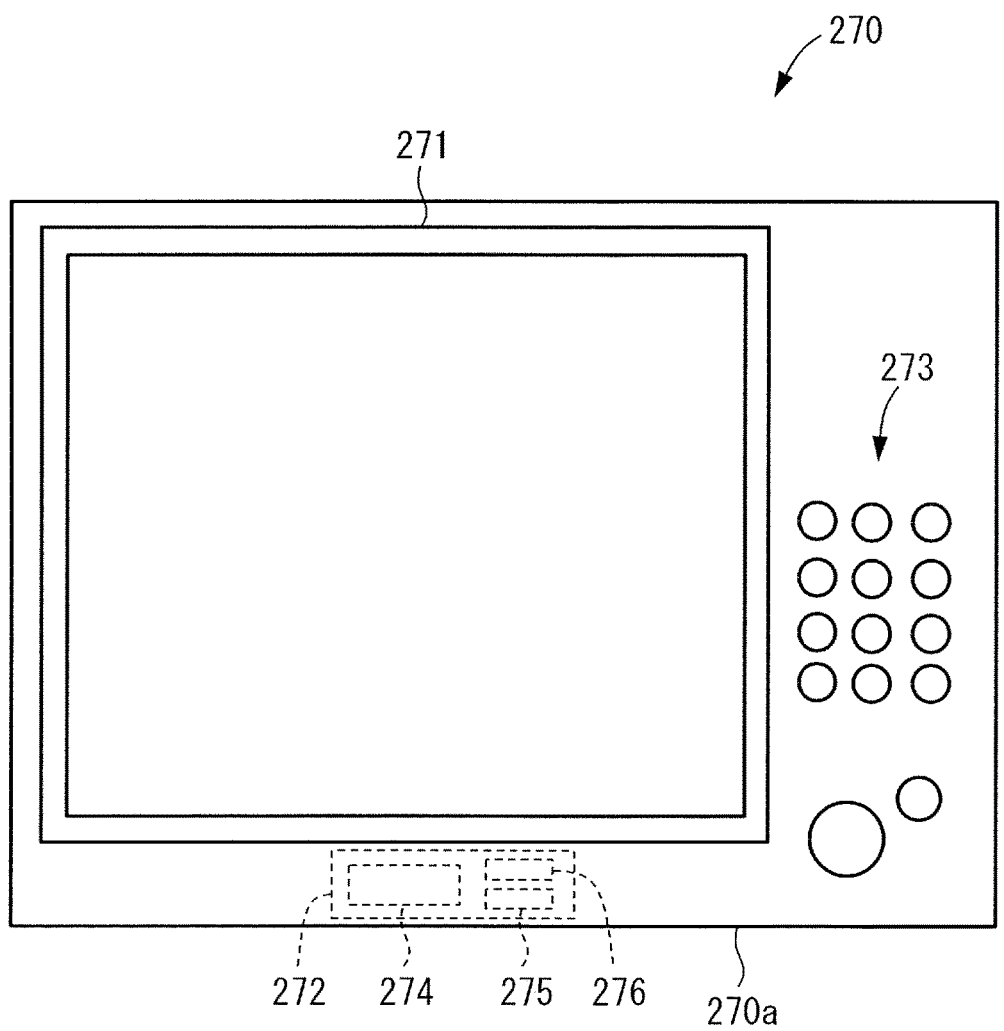
FIG. 7 is a front view schematically illustrating an operating portion of the second embodiment.

As illustrated in FIG. 6, the operation unit 270 is composed of a vertical operation panel provided at an upper front side of the apparatus body 10 through an arm 277. The operation unit 270 is separated from the apparatus body 10 and is supported by the arm 277 movably with respect to the apparatus body 10. As illustrated in FIGS. 6 and 7, the operation unit 270 includes a panel portion 271, an NFC substrate (communication portion) 272, and an input portion 273. In FIG. 6, 'B', 'F', 'L', and 'R' denote the same directions with those of the first embodiment. That is, 'U' denotes a direction of the upper surface of the image forming apparatus and 'D' denotes a direction of the lower surface of the image forming apparatus.

The panel portion 271 is set approximately vertically and is constructed by a resistance film type or an electrostatic capacitance type touch panel overlapped on a liquid crystal display type display panel in a thickness direction. The NFC substrate 272 communicable with the mobile terminal 101 by the NFC system includes an antenna 274 formed of a loop antenna, a communication circuit 275, and a detecting portion 276. That is, the NFC substrate 272 can communicate between the mobile terminal 101 brought close to the antenna 274 and the control portion 60 by the NFC system. The panel portion 271 and the antenna 274 are integrated with the operation unit 270, and the operation unit 270 is supported by the arm 277 movably with respect to the apparatus body 10 as described above.

The antenna 274 is disposed on the downward direction D side of the panel portion 271. That is, the antenna 274 is positioned under, in terms of the vertical direction of the image forming apparatus, and neighboring the panel portion 271. Then, the antenna 274 is disposed within an area of the panel portion 271 in terms of the left-right (LR) direction orthogonal to the vertical direction.

Here, the NFC substrate 272 integrated with the antenna 274 is disposed under and in the vicinity of the panel portion 271 in a front view of the panel portion 271. That is, the antenna 274 is disposed under the panel portion 271 in terms of the vertical direction of the image forming apparatus of the present embodiment. Then, the antenna 274 is disposed within the area of the panel portion 271 in the left-right (LR) direction orthogonal to the vertical direction. Because the panel portion 271 is provided approximately vertically in the present embodiment, the antenna 274 is disposed under the panel portion 271. Still further, the antenna 274 is provided at an edge portion 270a of the operation unit 270 in the present embodiment. This arrangement makes it possible to make the user harder from unintentionally covering the panel portion 271 by his/her hand in bringing the mobile terminal 101 close to the NFC substrate 272. Still further, because the NFC substrate 272 is disposed in the vicinity of the panel portion 71, the user can readily know the position of the NFC substrate 272.

Next, an operation for executing the communication with the mobile terminal 101 by the NFC system in the image forming apparatus 1 of the present embodiment will be described.

Figure 8:
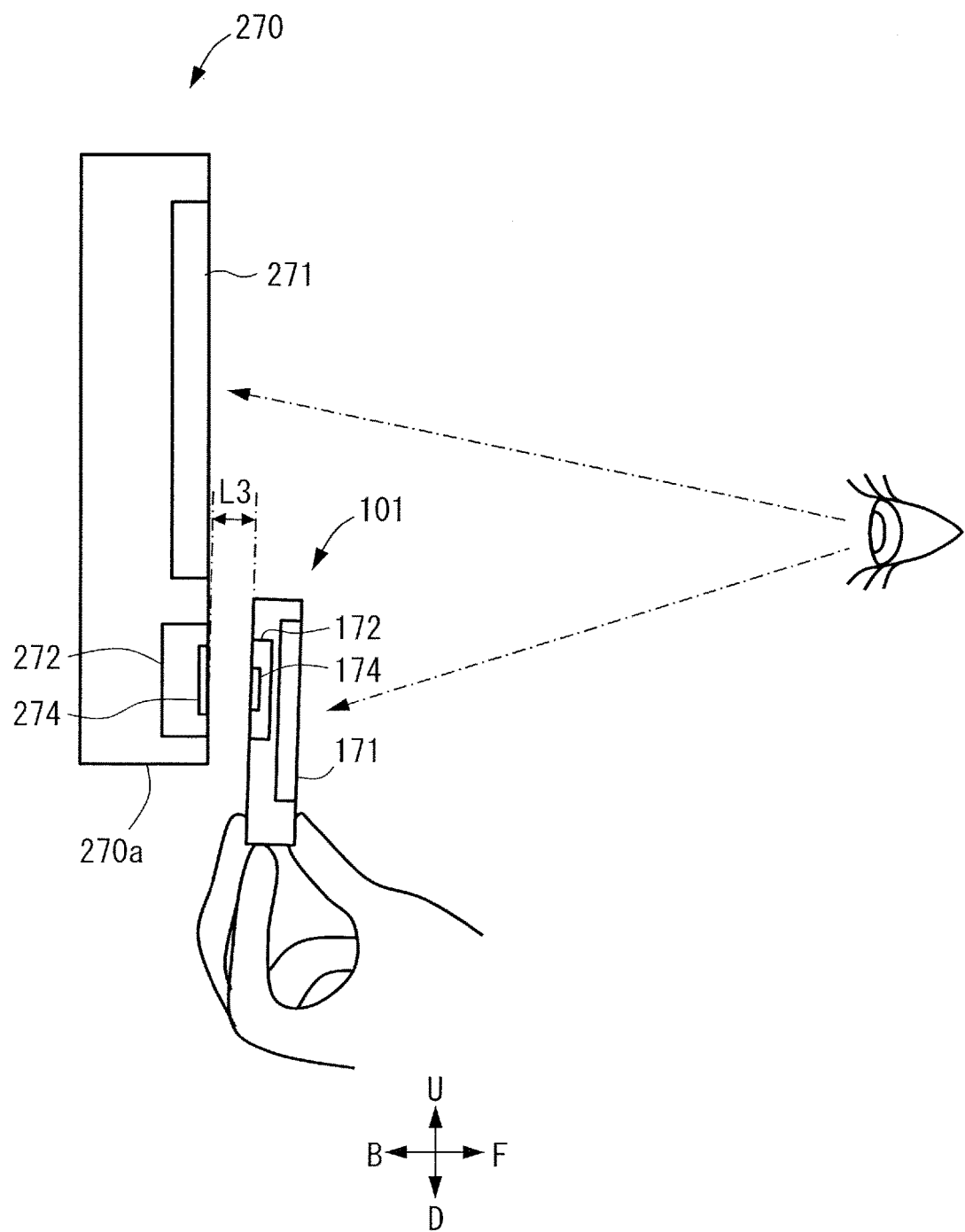
FIG. 8 is a section view schematically illustrating a state in which the mobile terminal is brought close to the operating portion in parallel with the operating portion of the second embodiment.

At first, a case when the user brings the mobile terminal 101 close to the operation unit 270 while holding the mobile terminal 101 approximately in parallel with the operation unit 270 as illustrated in FIG. 8 will be described. In this case, guidance for holding up the mobile terminal 101 is displayed on the panel portion 271. The user can execute the communication by bringing the mobile terminal 101 close to the NFC substrate 272 so as to fall within an area of radio waves of the NFC substrate 272 such that a distance between the antenna 274 and 174 falls within a distance L3. When the antenna is brought close to the antenna 274 within the distance L3, the control portion 60 performs authentication and others and authentication results are displayed on the panel portions 271 and 171, respectively. Because the hand holding the mobile terminal 101 does not overlap with the panel portion 271 in this case, it is possible to reduce the probability of unintentionally covering the panel portion 271 or of erroneously pressing the operation keys. Still further, because the NFC substrate 272 including the antenna 274 is disposed in the vicinity of the panel portion 271, the user can readily watch the guidance and can enjoy high operability. Still further, because the user can watch the respective panel portions 271 and 171 almost without moving the visual line as indicated by dot chain lines in FIG. 8, the operability is enhanced further.

Figure 9:
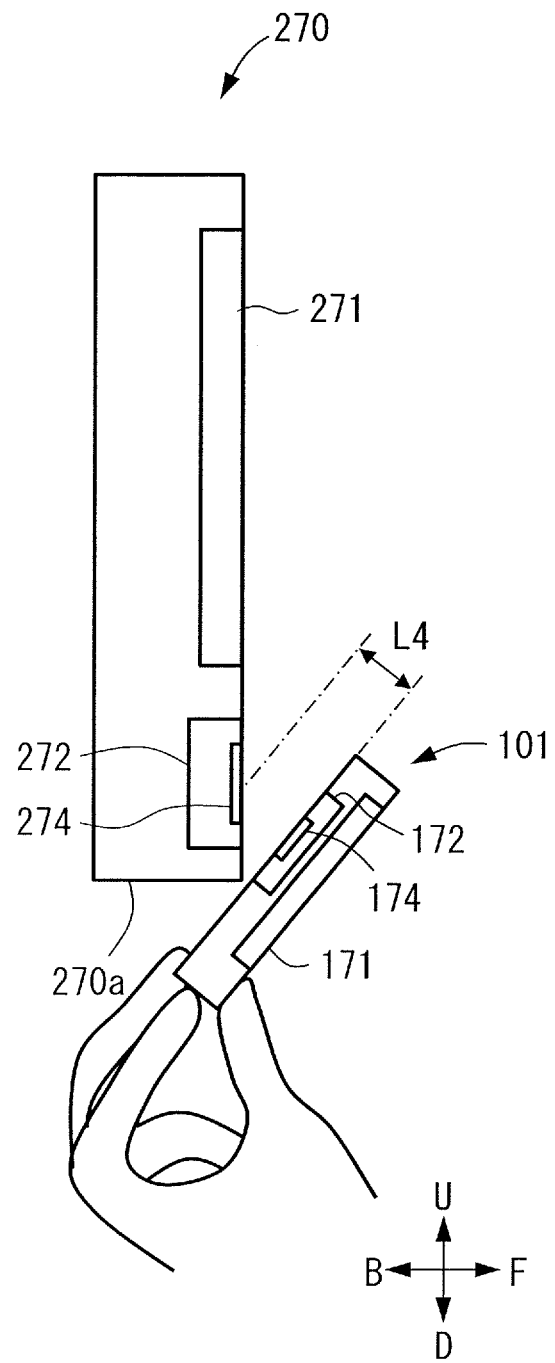
FIG. 9 is a section view schematically illustrating a state in which the mobile terminal is brought close to the operating portion of the second embodiment while tilting the mobile terminal.

Next, a case when the user brings the mobile terminal 101 close to the operation unit 270 while tilting the mobile terminal 101 with respect to the operation unit 270 as illustrated in FIG. 9 will be described. In this case, the user can execute the communication by bringing the mobile terminal 101 close to the operation unit 270 such that a distance between the antenna 274 and 174 falls within a distance L4. Here, at the edge portion 270a of the operation unit 270, the user brings the mobile terminal 101 close to the operation unit 270 while separating the front end of the mobile terminal 101 from the panel portion 271 so that the mobile terminal 101 does not touch the panel portion 271. This arrangement makes it possible to bring the NFC substrate 172 on the mobile terminal 101 side within the area of the radio waves of the antenna 274 and to execute the communication between the antenna 274 and 174.

As described above, according also to the image forming apparatus 1 of the present embodiment, the antenna 274 is disposed under and in the vicinity of the panel portion 271 in the front view of the panel portion 271. Therefore, it is possible to make the user harder from unintentionally covering the panel portion 271 by his/her hand or from touching the panel portion 271 by the hand or the mobile terminal 101 in bringing the mobile terminal 101 close to the antenna 274. Still further, because no flat space for holding up the mobile terminal 101 or the authentication card is required, the operation unit 270 can be downsized. This configuration makes it possible to improve the operability without increasing the size of the image forming apparatus 1.

Still further, because the antenna 274 is disposed in the edge portion 270a of the operation unit 270 also in the image forming apparatus 1 of the present embodiment, it is possible to execute the communication while tilting the mobile terminal 101 or the authentication card under the operation unit 270. Thereby, it is possible to execute the communication with the operation unit 270 even if the user brings the mobile terminal 101 close to the operation unit 270 while hanging the mobile terminal 101 from his/her neck.

Third Embodiment

A third embodiment of the present invention will be described below in detail with reference to FIG. 10. A configuration of the present embodiment is different from that of the first embodiment in that a panel portion 371 of an operating portion 370 is provided approximately vertically. The configuration of the present embodiment, other than that described above, is the same with that of the first embodiment, so that the same or corresponding components with those of the first embodiment will be denoted by the same reference numerals and detailed description thereof will be omitted here.

Figure 10:
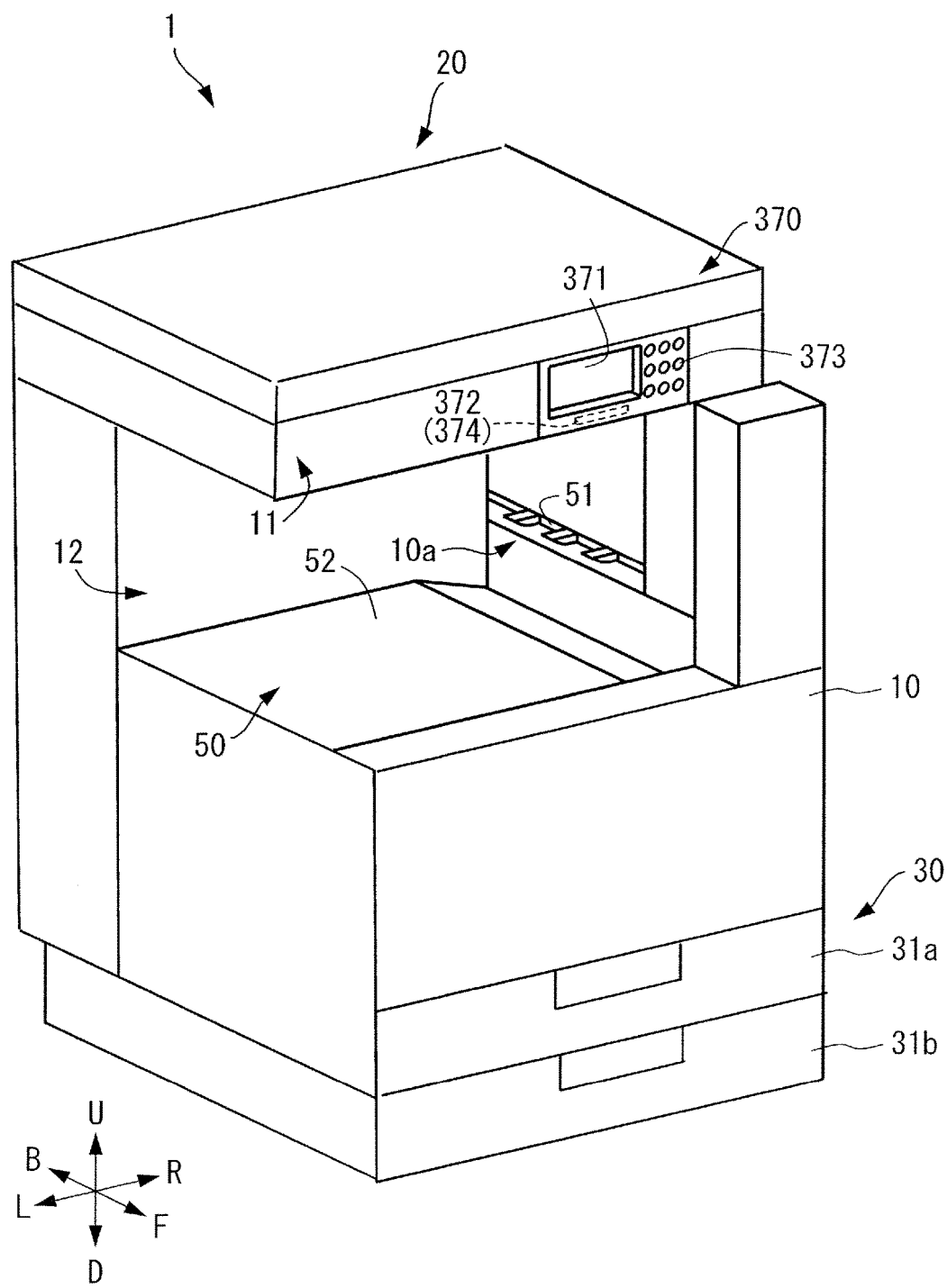
FIG. 10 is a perspective view schematically illustrating an image forming apparatus of a third embodiment.

As illustrated in FIG. 10, the operating portion 370 is composed of a vertical operation panel provided on a front wall 11 above the in-body space (concave portion) 12 of the apparatus body 10. According to the present embodiment, the operating portion 370 is disposed at a position on the front direction F side of the image reading portion 20 so that the user can readily operate. The operating portion 370 is integrated with the apparatus body 10 and fixedly provided immovably with respect to the apparatus body 10. The operating portion 370 includes a panel portion 371, an NFC substrate (communication portion) 372, and an input portion 373.

The panel portion 371 is provided approximately vertically and is constructed by a resistance film type or an electrostatic capacitance type touch panel overlapped on a liquid crystal display type display panel in a thickness direction. The NFC substrate 372 communicable with the mobile terminal 101 by the NFC system includes an antenna 374 formed of a loop antenna. The antenna 374 is disposed on the downward direction D side of the panel portion 371. That is, the antenna 374 is disposed at a position under, in terms of the vertical direction of the image forming apparatus, and neighboring the panel portion 371. Then, the antenna 374 is disposed within the area of the panel portion 371 in terms of the left-right (LR) direction orthogonal to the vertical direction.

Here, the NFC substrate 372 integrated with the antenna 374 is disposed under and in the vicinity of the panel portion 371 in a front view of the panel portion 371. That is, in the image forming apparatus 1, the antenna 374 is disposed under the panel portion 371 in terms of the vertical direction of the image forming apparatus. Then, the antenna 374 is disposed within the area of the panel portion 371 in terms of the left-right (LR) direction orthogonal to the vertical direction. Because the panel portion 371 is provided approximately vertically in the present embodiment, the antenna 374 is disposed under the panel portion 371. Still further, the antenna 374 is provided above the in-body space 12 formed in the apparatus body 10 and concaved rearward in the present embodiment.

The operation for executing the communication with the mobile terminal 101 by the NFC system in the image forming apparatus 1 of the present embodiment is the same with that of the second embodiment including the approximately vertical panel portion 271, so that a detailed description will be omitted here.

As described above, according also to the image forming apparatus 1 of the present embodiment, the antenna 374 is disposed under and in the vicinity of the panel portion 371 in the front view of the panel portion 371. Therefore, this arrangement makes it possible to make the user harder from unintentionally covering the panel portion 371 by his/her hand or from touching the panel portion 371 by the hand or the mobile terminal 101 in bringing the mobile terminal 101 close to the antenna 374. Still further, because no flat space for holding up the mobile terminal 101 or the authentication card is required, the operating portion 370 can be downsized. This configuration makes it also possible to improve the operability without increasing the size of the image forming apparatus 1.

Fourth Embodiment

A fourth embodiment of the present invention will be described below in detail with reference to FIG. 11. A configuration of the present embodiment is different from that of the first embodiment in that an operating portion 470 is provided separately from and movably with respect to the apparatus body 10. The configuration of the present embodiment, other than that described above, is the same with that of the first embodiment, so that the same or corresponding components with those of the first embodiment will be denoted by the same reference numerals and detailed description thereof will be omitted here.

Figure 11:
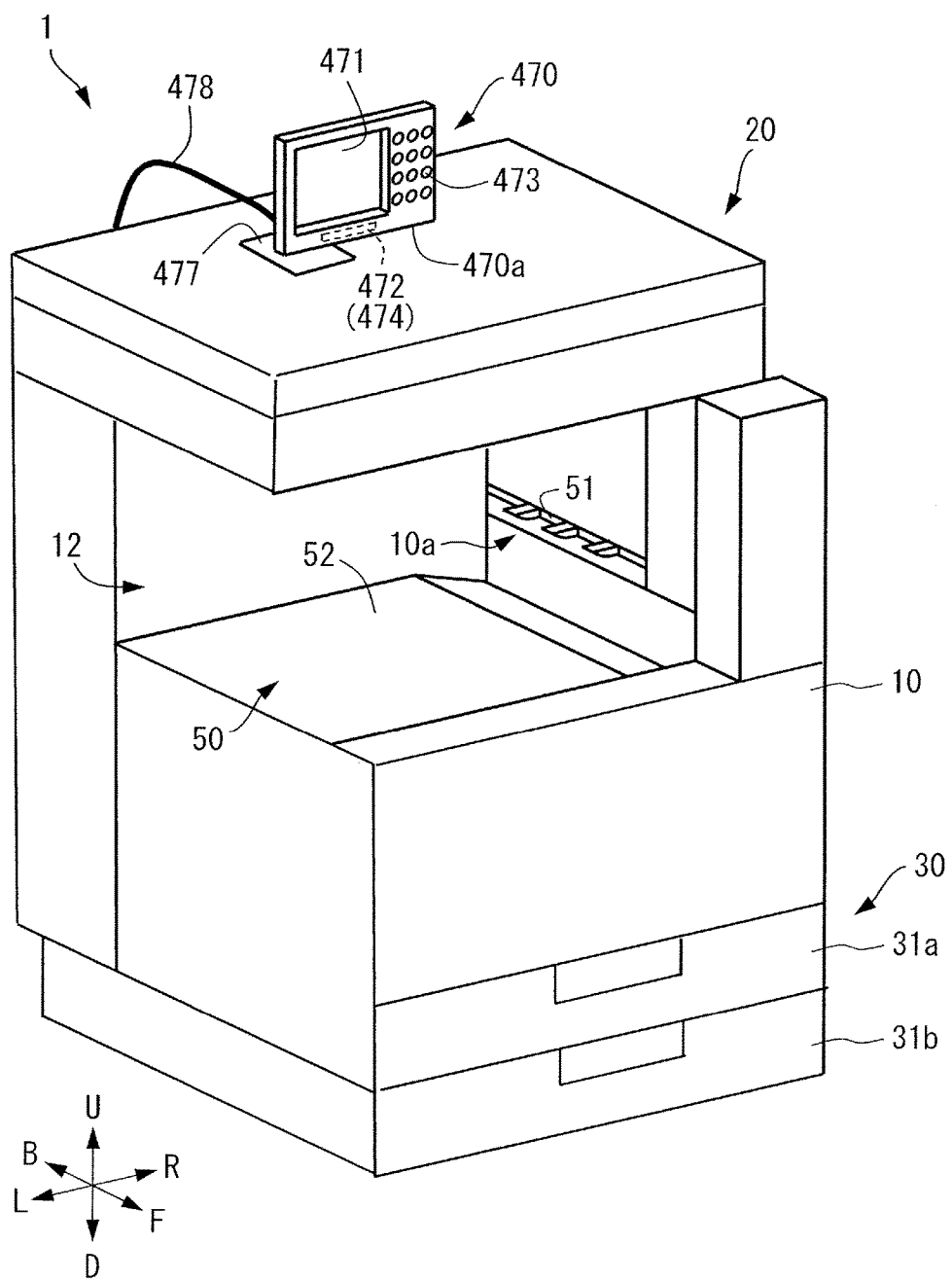
FIG. 11 is a perspective view schematically illustrating an image forming apparatus of a fourth embodiment.

As illustrated in FIG. 11, the operating portion 470 is composed of a vertical operation panel provided self-supportably by a base 477. The operating portion 470 is separated from the apparatus body 10, is connected with the control portion 60 of the apparatus body 10 by a cable 478, and is supported movably with respect to the apparatus body 10. The operating portion 470 can be placed at an appropriate position within a range reachable by the cable 478. The operating portion 470 includes a panel portion 471, an NFC substrate (communication portion) 472, and an input portion 473.

The panel portion 471 is set approximately in a vertical condition and is constructed by a resistance film type or an electrostatic capacitance type touch panel overlapped on a liquid crystal display type display panel in a thickness direction. The NFC substrate 472 communicable with the mobile terminal 101 by the NFC system includes an antenna 474 formed of a loop antenna. The NFC substrate 472 integrated with the antenna 474 is disposed under and in the vicinity of the panel portion 471 in a front view of the panel portion 471. Because the panel portion 471 is provided approximately vertically in the present embodiment, the antenna 474 is disposed at a position under and neighboring the panel portion 471. Still further, the antenna 474 is provided in an edge portion 470a of the operating portion 470 in the present embodiment. This arrangement makes it possible to make the user harder from unintentionally covering the panel portion 471 by his/her hand in bringing the mobile terminal 101 close to the NFC substrate 472.

An operation of the image forming apparatus 1 of the present embodiment executing the communication with the mobile terminal 101 by the NFC system is the same with that of the second embodiment including the panel portion 271 set approximately vertically, so that a detailed description thereof will be omitted here.

As described above, according also to the image forming apparatus 1 of the present embodiment, the antenna 474 is disposed under and in the vicinity of the panel portion 471 in the front view of the panel portion 471. Therefore, it is possible to make the user harder from unintentionally covering the panel portion 471 by his/her hand or from touching the panel portion 471 by the user's hand or by the mobile terminal 101 in bringing the mobile terminal 101 close to the antenna 474. Still further, because no flat space for holding up the mobile terminal 101 or the authentication card is required, the operating portion 470 can be downsized. Accordingly, this configuration makes it possible to improve the operability without increasing the size of the image forming apparatus 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-144580, filed on Jul. 22, 2015, which is hereby incorporated by reference herein in its entirety.

What is claimed is:

1. An image forming apparatus, comprising:
an image forming device that forms an image on a recording medium;
a reading device disposed over the image forming device and that reads an image on an original;
a discharging tray disposed over the image forming device and below the reading device, and on which a recording medium, on which the image is formed by the image forming device, is stacked, the discharging tray arranged such that the recording medium stacked on the discharging tray is able to be taken out from a front side of the image forming apparatus; and
an operation device capable of transmitting and/or receiving radio waves to/from a communication device by a near field communication when the communication device is brought in close proximity to the operation device, the operation device disposed on a front side of the reading device in a direction heading from a back surface to a front surface of the image forming apparatus such that the operation device neighbors the reading device, and at least a part of the operation device overlaps with the discharging tray in a direction orthogonal to the direction heading from the back surface to the front surface of the image forming apparatus,
the operation device comprising:
a display panel configured to display an information of the image forming apparatus and receive an input operation from a user to change the information displayed on the display panel according to the input operation to the display panel; and
a target surface to which the communication device is brought into close proximity, and which is provided between a lower end of the display panel and a lower end of the operation device when viewing the operation device in a direction perpendicular to the display panel.

2. The image forming apparatus according to claim 1, wherein the operation device further comprises at least one input key for inputting a signal to the image forming apparatus, the at least one input key being disposed at a position neighboring the display panel in the direction orthogonal to the direction heading from the back surface to the front surface of the image forming apparatus.

3. The image forming apparatus according to claim 2, wherein the at least one input key includes a ten key arrangement for inputting numerals.

4. The image forming apparatus according to claim 2, wherein the at least one input key includes a key for starting an image forming operation.

5. The image forming apparatus according to claim 2, wherein the at least one input key includes a key for stopping an image forming operation.

6. The image forming apparatus according to claim 1, wherein the operation device further comprises:
an antenna device capable of transmitting/receiving radio waves to/from the communication device when the communication device is brought into close proximity to the target surface, and capable of executing communication between the communication device and the antenna device by the a near field communication system, the antenna device being provided inside the operation device and being provided between the lower end of the display panel and the lower end of the operation device when viewing the operation device in the direction perpendicular to the display panel; and a communication circuit electrically connected with the antenna device, and provided inside the operation device between the lower end of the display panel and the lower end of the operation device when viewing the operation device in the direction perpendicular to the display panel.

7. The image forming apparatus according to claim 6, wherein the antenna device is disposed at an end side of the operation device in the direction from the back surface to the front surface of the image forming apparatus.

8. The image forming apparatus according to claim 6, wherein the antenna device is disposed at a front end part of the operation device in the direction from the back surface to the front surface of the image forming apparatus.

9. The image forming apparatus according to claim 1, wherein the operation device is movable with respect to an apparatus body of the image forming apparatus.

\* \* \* \* \*